United States Patent [19]

Fischer

[11] Patent Number: 4,929,127
[45] Date of Patent: May 29, 1990

[54] DRILL BIT FOR PRODUCING DRILLED HOLES WITH AN UNDERCUT

[75] Inventor: Artur Fischer, Waldachtal, Fed. Rep. of Germany

[73] Assignee: Fischerwerke Artur Fischer GmbH & Co. KG, Waldachtal/Tumlingen, Fed. Rep. of Germany

[21] Appl. No.: 369,728

[22] Filed: Jun. 22, 1989

[30] Foreign Application Priority Data

Jun. 22, 1988 [DE] Fed. Rep. of Germany ....... 3821056

[51] Int. Cl.⁵ .............................................. B23B 41/00
[52] U.S. Cl. .......................................... 408/81; 408/83
[58] Field of Search .................. 408/72 B, 79, 80, 81, 408/83, 113, 114, 115 B, 117, 118, 186, 241 B, 200, 201, 72 R; 76/108 T, 108 R

[56] References Cited

U.S. PATENT DOCUMENTS

| | | | |
|---|---|---|---|
| 1,847,302 | 3/1932 | Emmons | 76/108 T |
| 3,554,192 | 1/1971 | Isberner | 408/201 |
| 3,893,353 | 7/1975 | Lahmeyer | 76/108 T |
| 4,010,807 | 3/1977 | Fischer | 408/83 |

FOREIGN PATENT DOCUMENTS

| | | | |
|---|---|---|---|
| 34658 | 9/1981 | European Pat. Off. | 408/200 |
| 38917 | 11/1981 | European Pat. Off. | 408/200 |
| 3014388 | 10/1981 | Fed. Rep. of Germany . | |
| 3426092 | 1/1986 | Fed. Rep. of Germany . | |

*Primary Examiner*—Daniel Howell
*Attorney, Agent, or Firm*—Michael J. Striker

[57] ABSTRACT

A drill bit for producing drill holes with an undercut and comprising a drill bit shank, a drill bit tip mounted at an end of the drill bit shank and projecting laterally beyond the shank diameter, a rounded collar spaced from the drill bit tip and integrally formed on the drill bit shank, and a longitudinally displaceable sleeve mounted between the drill bit tip and the collar and having an internal diameter which is smaller than the diameter of the collar and the maximum width of the drill bit tip, and a method of manufacturing such a drill bit.

8 Claims, 1 Drawing Sheet

DRILL BIT FOR PRODUCING DRILLED HOLES WITH AN UNDERCUT

BACKGROUND OF THE INVENTION

The invention relates to a drill bit for producing drilled holes with an undercut.

Drilling devices are known which comprises a holding element insertable into a drilling machine. The holding element has an internal thread into which a drill bit specially provided for producing undercuts can be screwed in. The known drilling devices are equipped with suction means which encloses the drill bit seat with a drilling bell. A sleeve-shaped element can project from the drilling bell, which element partially encloses the shank of the screwed-in drill bit and center the drill bit in the drilled hole during the drilling operation.

The conventional drilling devices for producing undercuts are complex and because of their construction, have to use a separate drill-bit holder into which the drill bit can be screwed.

SUMMARY OF THE INVENTION

The object of the invention is to provide a drill bit for producing drilled holes with an undercut, which drill bit can be clamped directly in a drill chuck of an impact drilling machine and has a centering element.

The object of the invention is achieved by providing a drill bit with a one-piece drill bit shank having two enlargements arranged at an interval from one another in the form of the drill bit tip and a collar. Between the tip and the collar, a guide sleeve is arranged such that it can be displaced longitudinally. The external diameter of the guide sleeve corresponds to the maximum width of the drill bit tip so that the guide sleeve penetrates essentially with an exact fit during the drilling operation in the drilled hole. The drill bit shank guided in it, is held concentrically in the drilled hole.

Since the drill bit and the guide sleeve, which can also be referred to as the centering sleeve, consist of hardened metal, a special manufacturing process is required to locate the guide sleeve on the one-piece drill bit shank. The guide sleeve may either by slotted prior to hardening and pushed in its expanded state laterally in the radial direction onto the drill bit shank, and subsequently compressed and the hardened or, first of all, the hardened guide sleeve is pushed axially onto the drill bit shank, which has not yet been supplied with a drill bit tip. The drill bit tip is then put into position and brazed to the drill bit shank. As a result of this measure, a drill bit of extremely simple construction is obtained which is suitable for producing drilled holes with an undercut in the region of the bottom of the drilled hole.

For a defined pivoting movement, which is required to produce the undercut by reaming out the drilled hole, the inner bore of the centering sleeve can taper.

The guide sleeve preferably has a flange facing the collar with an inwardly curved bearing surface which provides a pivotal bearing for the collar of rounded construction. The pivot movement for reaming out the undercut is facilitated thereby.

It is very advantageous to provide drilling-dust grooves to extend along the shank, starting from the drill bit tip and continuing beyond the collar. The grooves serve to transport the drilling dust from the drilled hole to the outside.

The drill bit according to the invention can be produced in an especially simple mamner by slotting the guide sleeve in an unhardened state, expanding the sleeve, and pushing it over the drill bit shank with subsequent compression the sleeve to the initial diameter and hardening it. The drill bit according to the invention can also be produced by pushing the guide sleeve over the drill bit shank prior to attachment of the drill bit tip which is then inserted in a slot in the shank and is brazed thereto.

The present invention as to its construction so to its mode of operation, together with additional objects and advantages thereof, will be best understood from the following description of the preferred embodiments with reference to the accompanying drawings.

DESCRIPTION OF THE PREFERRED EMBODIMENTS

Figure 1:
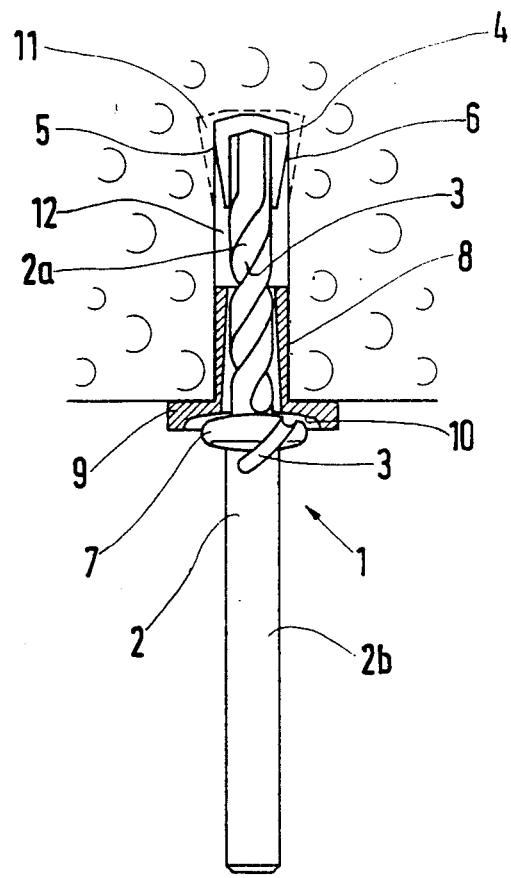
FIG. 1 shows a partially cross-sectional view of a drill bit according to the invention with a guide sleeve inserted into a drilled hole.

A drill bit 1 illustrated in FIG. 1 comprises a drill bit shank 2 which has a front section 2a provided with drilling-dust grooves 3, and a rear section 2b. The rear shank section 2b can be clamped in a drill chuck of an impact drilling machine or similar apparatus (not illustrated here).

The drill shank section 2a has a longitudinal slot for receiving a drill bit tip 4 brazed therein. The drill bit tip 4 has lateral cutting edges 5, 6 which project beyond the adjoining shank section 2a. At the transition from the shank section 2a to the shank section 2b, there is molded a rounded collar 7. The drilling-dust groove 3 is guided over the collar 7 and extends as far as the shank section 2b.

Between the drill bit tip 4 and the collar 7, a longitudinally displaceable guide sleeve 8 encloses the shank 2. The outer diameter of the sleeve-shaped part of the guide sleeve 8 corresponds to the width of the drill bit tip 4. The internal diameter of the guide sleeve 8 is slightly larger than the shank diameter of the section 2a. On its side facing the collar 7, the guide sleeve has a flange 9 with a curved bearing surface 10 for receiving the collar 7.

Beneath the seat of the collar 7 on the bearing surface 10, the drill bit 1 can be pivoted in the drilled hole when simultaneously rotated, whereby an undercut 11 is reamed out, as shown by broken lines at the bottom of the drilled hole. An expansible plug, known per se, can be inserted into a drilled hole 12 with an undercut 11. The expansible part of the plug would engage a matching fit in the undercut 11.

Figure 2:
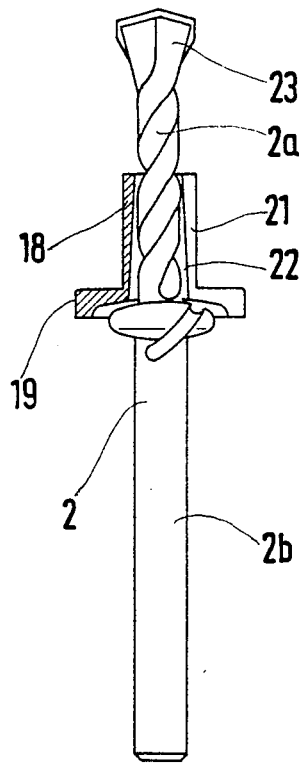
FIG. 2 shows a second embodiment of a drill bit according to the invention with a guide sleeve.

FIG. 2 shows an embodiment of a drill bit, the guide sleeve 18 of which has a longitudinal slot 21 extending along the entire length of the sleeve. The internal bore 22 tapers and has its maximum diameter at the flange 19. The shank 2 of the drill bit has a flared enlargement 23 in the region of the drill bit tip 4.

The tapering internal bore 22 restricts the pivoting movement of the drill shank inside the guide sleeve 18, whereby the maximum pivoting movement is restricted, so that consistent undercuts can be produced.

In the case of the drill bit illustrated in FIG. 1, the hardened guide sleeve 8 is pushed onto the shank before the drill bit tip 4 is inserted, whereas in the case of of the drill bit illustrated in FIG. 2 the as yet unhardened guide sleeve 18 is expanded and pushed from the side onto the drill bit shank. Subsequently, in the construction according to FIG. 2, the guide sleeve 18 is compressed again and then hardened. In both embodiments the entire drill bit shank, which comprises the sections 2a and 2b, forms a one-piece part together with the integrally molded collar 7.

While the invention has been illustrated and described as embodied in a drill bit for producing drilled holes with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A drill bit for producing drilled holes with an undercut and comprising a drill bit shank having an end; at least one drill bit tip which is mounted at said end, projects laterally beyond said drill bit shank, and has a maximum width; a rounded collar having a diameter spaced from the drill bit tip, and integrally formed on the drill bit shank; and a longitudinally displaceable guide sleeve mounted between the drill bit tip and the collar and having an internal diameter which is smaller than the diameter of the collar and smaller than the maximum width of the drill bit tip; the drill bit tip having lateral cutting edges, the drill bit shank having a flared enlargement in a region of the lateral cutting edges of the drill bit tip, and the guide sleeve having a continuous longitudinal slot.

2. A drill bit for producing drilled holes with an undercut and comprising a drill bit shank having an end; at least one drill bit tip which is mounted at said end, projects laterally beyond said drill bit shank, and has a maximum width; a rounded collar having a diameter spaced from the drill bit tip, and integrally formed on the drill bit shank; and a longitudinally displaceable guide sleeve mounted between the drill bit tip and the collar and having an internal diameter which is smaller than the diameter of the collar and smaller than the maximum width of the drill bit tip, the guide sleeve having a longitudinal bore which tapers.

3. A drill bit according to claim 2, wherein said guide sleeve has a side facing the collar, and a flange at said side.

4. A drill bit according to claim 3, wherein the flange has a curved bearing surface facing the collar.

5. A drill bit according to claim 2, wherein the shank has drilling-dust grooves extending therealong beginning from the drill bit tip and continuing beyond the collar.

6. A drill bit according to claim 2, wherein the drill bit shank and the guide sleeve are hardened.

7. A method of manufacturing a drill bit comprising the steps of providing a drill bit shank; providing a metal guide sleeve and slotting the same in unhardened state; expanding the guide sleeve and then pushing laterally over the drill bit shank; compressing the guide sleeve thereafter to its original diameter; and then hardening the guide sleeve on the drill shank.

8. A method of manufacturing a drill bit comprising the steps of providing a drill bit shank having a slot at an end thereof; pushing a guide sleeve onto the drill bit shank; and thereafter inserting the drill bit tip into the slot and brazing the drill bit tip to the shank.

* * * * *